Oct. 10, 1950     D. C. TALIAFERRO     2,525,005
HOLDER FOR GLASS COFFEE MAKERS
Filed Sept. 16, 1947
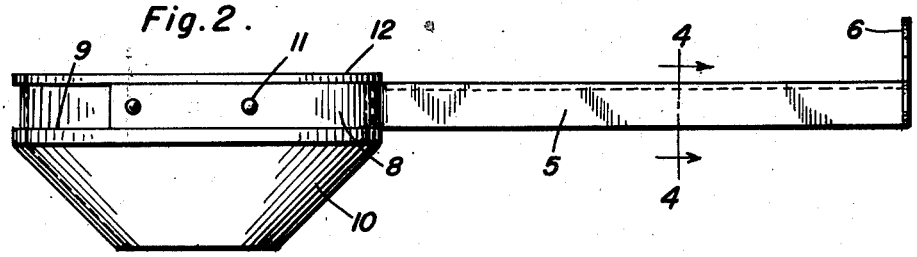
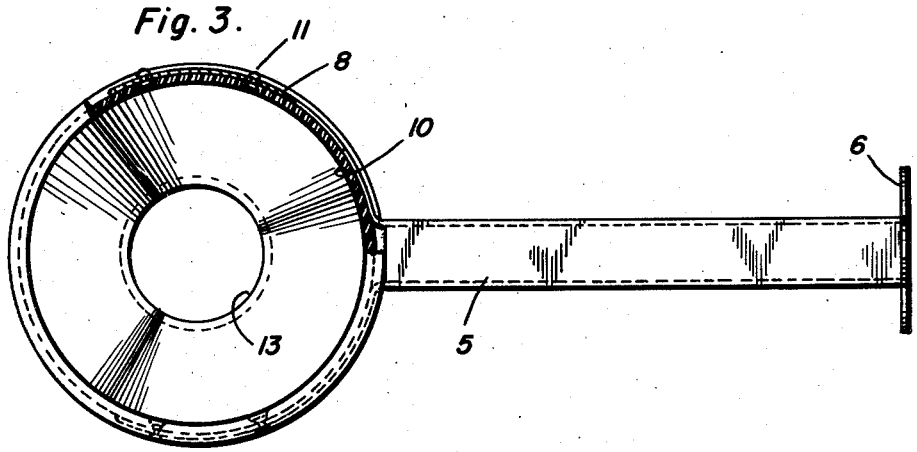
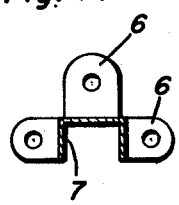
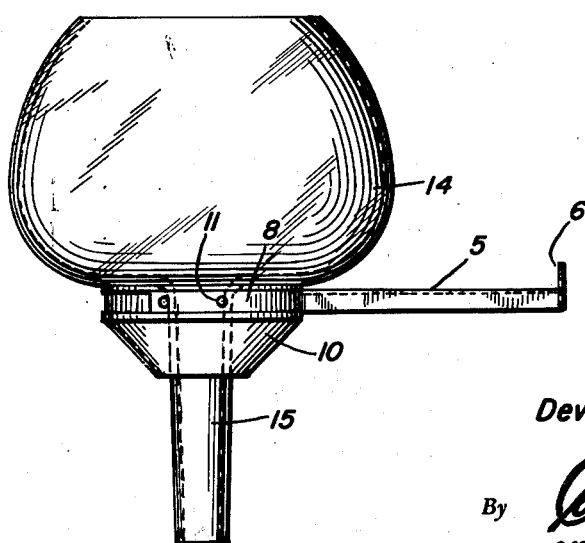
Inventor
Devillo C. Taliaferro
By *Clarence A. O'Brien and Harvey B. Jacobson*
Attorneys Patented Oct. 10, 1950

2,525,005

UNITED STATES PATENT OFFICE 2,525,005

HOLDER FOR GLASS COFFEE MAKERS

Devillo C. Taliaferro, East St. Louis, Ill.

Application September 16, 1947, Serial No. 774,293

1 Claim. (Cl. 248—315)

The present invention relates to new and useful improvements in holders for glass coffee makers and more particularly to a device of this character including a supporting arm for attaching the holder to a wall or other supporting surface whereby the coffee maker may be supported in the holder for draining purposes and to protect the coffee maker from becoming accidentally broken.

An important object of the present invention is to provide a holder of this character which includes a rigid metal arm for attaching to a wall or other supporting structure and a non-metallic cup-like member supported by the arm and in which the bowl of a glass coffee maker is supported with the neck of the bowl extending downwardly through the cup for draining purposes and whereby the coffee maker may be placed in the holder without coming into contact with any metal and thus reduce the danger of breaking the coffee maker.

A still further object is to provide a device of this character of simple and practical construction, which is neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing a glass coffee maker supported in position in the holder;

Figure 2 is an enlarged side elevational view with the coffee maker removed therefrom;

Figure 3 is a top plan view with parts broken away and shown in section; and

Figure 4 is a transverse sectional view taken on a line 4—4 of Figure 2.

Referring now to the drawings in detail wherein for the purpose of illustration I have disclosed a preferred embodiment of the invention, the numeral 5 designates a channel-shaped supporting arm having apertured tongues 6 bent outwardly at right angles from the walls of the arm at one end thereof to provide means for attaching the arm in a horizontal position to a wall or other suitable supporting structure.

The flanges 7 of the arm are formed with outwardly curved extensions 8 which are secured in a channel 9 at the upper portion of a cup-like holder 10 by rivets or the like 11 whereby to provide a lip 12 at the upper edge of the holder 10 which overlies the curved extensions 8.

The lower end of the holder 10 is tapered and formed with a central opening 13.

In the use of the invention, the apertured tongues 6 at the inner end of the arm 5 are attached to a wall or other suitable supporting structure with the arm 5 extending horizontally outwardly therefrom and the bowl portion 14 of a conventional glass coffee maker is then positioned on the lips 12 at the upper edge of the holder 10 and with the neck portion 15 of the coffee maker extending downwardly through the opening 13 whereby the liquid contained in the bowl may drain therefrom and the coffee maker is thus supported against danger of breakage, when not in use.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible of certain changes fully comprehended by the spirit of the invention as herein described and the scope of the appended claim.

Having described the invention, what is claimed as new is:

A holder for glass coffee makers comprising a cup-like member having an opening in its bottom, said member having an annular groove, a channel shaped supporting arm, angular attaching tongues at the inner end of the arm and formed as a continuation of the opposed flanges and the connecting portion for said flanges respectively, and arcuate extensions at the inner ends of the flanges of said arm secured in said groove.

DEVILLO C. TALIAFERRO.

REFERENCES CITED

The following references are of record in the file of this patent:

UNITED STATES PATENTS

| Number | Name | Date |
| --- | --- | --- |
| 288,058 | Hollister | Nov. 6, 1883 |
| 365,555 | Tolman | June 28, 1887 |
| 506,587 | Dye et al. | Oct. 10, 1893 |
| 753,939 | Viner | Mar. 8, 1904 |
| 1,190,094 | Born | July 4, 1916 |

FOREIGN PATENTS

| Number | Country | Date |
| --- | --- | --- |
| 568,689 | France | Mar. 31, 1924 |